(12) United States Patent
Pugh

(10) Patent No.: US 9,441,724 B1
(45) Date of Patent: Sep. 13, 2016

(54) METHOD AND SYSTEM FOR MONITORING AND CONTROLLING A TRANSMISSION

(71) Applicant: Brunswick Corporation, Lake Forest, IL (US)

(72) Inventor: Jason F. Pugh, Ripon, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 14/679,164

(22) Filed: Apr. 6, 2015

(51) Int. Cl.
*B63H 21/21* (2006.01)
*F16H 57/01* (2012.01)
*F16H 61/12* (2010.01)

(52) U.S. Cl.
CPC .............. *F16H 57/01* (2013.01); *B63H 21/21* (2013.01); *F16H 61/12* (2013.01); *B63H 2021/216* (2013.01); *F16H 2057/014* (2013.01); *F16H 2061/1216* (2013.01); *F16H 2061/1276* (2013.01)

(58) Field of Classification Search
CPC ........ F16H 57/01; F16H 61/12; B63H 21/21
USPC .................................................... 701/121, 21
See application file for complete search history.

(56) References Cited

U.S. PATENT DOCUMENTS

| | | | |
|---|---|---|---|
| 3,557,911 A * | 1/1971 | Ellard | F16D 49/12 188/77 R |
| 5,314,044 A | 5/1994 | Sharp | |
| 6,260,671 B1 | 7/2001 | Fujita | |
| 6,350,165 B1 | 2/2002 | Neisen | |
| 6,435,923 B1 | 8/2002 | Ferguson | |
| 6,623,320 B1 | 9/2003 | Hedlund | |
| 6,705,907 B1 | 3/2004 | Hedlund | |
| 7,118,434 B2 | 10/2006 | Arvidsson et al. | |
| 7,127,333 B2 | 10/2006 | Arvidsson | |
| 7,153,101 B2 | 12/2006 | Mansson | |
| 7,182,657 B2 | 2/2007 | Mansson | |
| 7,220,157 B2 | 5/2007 | Pettersson | |
| 7,238,065 B2 | 7/2007 | Bremsjo et al. | |
| 7,458,866 B2 | 12/2008 | Nakamura et al. | |
| 7,524,219 B2 | 4/2009 | Torrangs et al. | |
| 7,666,040 B2 | 2/2010 | Arvidsson | |
| 7,840,318 B2 | 11/2010 | Bremsjo | |
| 7,891,263 B2 | 2/2011 | Mowbray et al. | |
| 7,942,712 B2 | 5/2011 | Suzuki et al. | |
| 8,060,265 B2 | 11/2011 | Hallenstvedt et al. | |
| 8,109,800 B2 | 2/2012 | Okabe et al. | |
| 8,157,694 B2 | 4/2012 | Nakamura et al. | |

(Continued)

OTHER PUBLICATIONS

Unpublished U.S. Appl. No. 14/585,872, filed Dec. 30, 2014.

(Continued)

*Primary Examiner* — Behrang Badii
*Assistant Examiner* — Michael Berns
(74) *Attorney, Agent, or Firm* — Andrus Intellectual Property Law, LLP

(57) ABSTRACT

A method of monitoring and controlling a transmission in a marine propulsion device comprises the steps of receiving a rotational input speed of an input shaft to the transmission, receiving a rotational output speed of an output shaft from the transmission, receiving a shift actuator position value, and receiving an engine torque value. The method further comprises calculating a speed differential based on the input speed and the output speed, and generating a slip profile based on a range of speed differentials, engine torque values, and shift actuator position values.

20 Claims, 6 Drawing Sheets

(56) References Cited

U.S. PATENT DOCUMENTS

| | | |
|---|---|---|
| 8,277,270 B2 | 10/2012 | Ryuman |
| 8,303,359 B2 | 11/2012 | Matsuda et al. |
| 8,317,556 B2 | 11/2012 | Suzuki et al. |
| 8,408,953 B2 | 4/2013 | Bremsjo et al. |
| 8,439,800 B1 | 5/2013 | Bazan et al. |
| 8,454,402 B1 | 6/2013 | Arbuckle et al. |
| 8,478,464 B2 | 7/2013 | Arbuckle et al. |
| 8,849,489 B2 * | 9/2014 | Patel .................. B60K 6/445 477/166 |
| 8,924,054 B1 | 12/2014 | Arbuckle et al. |
| 2005/0073398 A1 * | 4/2005 | Sayman .................. F16H 61/12 340/441 |
| 2009/0197486 A1 | 8/2009 | Szilagyi et al. |
| 2010/0068950 A1 | 3/2010 | Lundgren |
| 2011/0166757 A1 * | 7/2011 | Otanez .................. B60W 50/06 701/60 |
| 2012/0283922 A1 * | 11/2012 | Phillips ........... B60W 30/18027 701/66 |
| 2014/0045393 A1 | 2/2014 | Kuriyagawa et al. |

OTHER PUBLICATIONS

Unpublished U.S. Appl. No. 14/258,516, filed Apr. 22, 2014.
Unpublished U.S. Appl. No. 14/574,953, filed Dec. 18, 2014.

* cited by examiner

METHOD AND SYSTEM FOR MONITORING AND CONTROLLING A TRANSMISSION

FIELD

The present disclosure relates to control strategies for a transmission in an internal combustion engine, and more particularly to methods and systems for monitoring and/or controlling a transmission of a marine engine.

BACKGROUND

The following U.S. patents are incorporated herein by reference:

U.S. Pat. No. 3,557,911 discloses a band brake having a fixed anchorage at one end and brake actuating means acting on the other end. The actuating means acts on the band through means exerting a reaction corresponding to the applying load on the fixed anchorage, which reaction acts in opposition to the torque load applied to the anchorage by the brake band so as to reduce the resultant load on the anchorage.

U.S. Pat. No. 5,314,044 discloses a brake band retainer mechanism for an automatic washer which ensures that the brake band will be held away from the brake drum when the brake is in the relaxed position, yet will be held close to the drum for ready engagement. A support frame for the brake assembly has four legs, one of the legs pivotally carrying a bracket to which the band is attached, two opposite legs have a flange thereon providing radial and vertical support for the band in its relaxed position, and a fourth, intermediate leg carrying a resilient member which presses against an outer surface of the band to bias the band against the support flange surfaces when the band is relaxed. The resilient member is held on the fourth leg without additional fasteners.

U.S. Pat. No. 6,260,671 discloses a brake band apparatus which is simple in mechanism and improved in the life of a frictional material. A double-wrap brake band apparatus is provided with outer bands having a frictional material secured to the inner peripheral surface thereof, an intermediate band interposed between the outer bands and having a frictional material secured to the inner peripheral surfaces thereof, a coupling portion for coupling one end portion of each of the outer bands and one end portion of the intermediate band in the circumferential direction thereof, an apply bracket integral with or discretely from the coupling portion, a first anchor bracket on the free ends of the outer bands in the circumferential direction thereof, a second anchor bracket on the free end of the intermediate band in the circumferential direction thereof, and an actuator for giving a load in two directions to the apply bracket.

U.S. Pat. No. 6,350,165 discloses an inboard/outboard powered watercraft that incorporates a transmission in its vertical drive unit for providing two forward speeds plus reverse. The transmission is packaged to fit within the vertical drive unit by incorporating a bevel gear apparatus. In one embodiment, the transmission also includes a planetary gear apparatus together with two hydraulic clutches and a ring gear brake. In a second embodiment, three hydraulic clutches are utilized with bevel gears alone to provide the two forward and reverse speeds.

U.S. Pat. No. 6,435,923 discloses a two-speed transmission with reverse gearing for a watercraft. The transmission is disposed in the gimbal housing passing through the transom of the watercraft. A pair of planetary gears shares a common ring gear to provide both forward-reverse and first-second gearing in a very compact package. The transmission housing may be formed in two portions, a first housing containing the forward-reverse gear mechanisms and a second housing containing the first-second gear mechanism. The transmission output shaft is connected to the drive shaft of a vertical drive unit by a double universal joint that may be replaced without disassembling the transmission components.

U.S. Pat. No. 7,458,866 discloses an outboard drive including a prime mover having an output shaft. A driveshaft is coupled with the output shaft. Both shafts having axes that extend at least generally parallel to each other. A propulsion device is coupled with the driveshaft. The prime mover rotates the output shaft to drive the propulsion device through the driveshaft. A speed change mechanism is positioned between the output shaft and the driveshaft. The speed change mechanism changes a rotational speed of the output shaft transmitted to the driveshaft.

U.S. Pat. No. 7,891,263 discloses a two speed transmission system mounted for driving a marine craft comprising: an input shaft coupled in direct connection with a driveshaft of an engine of the marine craft; an output shaft coaxial with the input shaft coupled in direct connection with a driveline of the marine craft; a first gear train for transmitting drive at a fixed first gear ratio; a second gear train for transmitting drive at a fixed second gear ratio; a first friction clutch operable to engage/disengage the first gear train; and a second friction clutch operable to engage/disengage the second gear train, wherein in shifting between the first gear ratio and the second gear ratio one of the friction clutches is disengaged using controlled slippage while the other friction clutch is engaged using controlled slippage.

U.S. Pat. No. 7,942,712 discloses an outboard motor that includes a power source, a boat propulsion section, a shift position switching mechanism, a clutch actuator, and a control device. The shift position switching mechanism switches among a first shift position in which a first clutch is engaged and a second clutch is disengaged, a second shift position in which the first clutch is disengaged and the second clutch is engaged, and a neutral position in which both the first clutch and the second clutch are disengaged. When a gear shift is to be made from the first shift position to the second shift position, the control section causes the clutch actuator to gradually increase an engagement force of the second clutch. The outboard motor reduces the load to be applied to the power source and the power transmission mechanism at the time of a gear shift in a boat propulsion system including an electronically controlled shift mechanism.

U.S. Pat. No. 8,109,800 discloses a transmission device that includes hydraulic type transmission mechanisms arranged to change the speed or the direction of rotation of an engine, and hydraulic pressure control valves arranged to control hydraulic pressure supplied to the hydraulic type transmission mechanisms. The hydraulic pressure control valves are disposed on one side or the other side in the watercraft width direction. The transmission device provides an outboard motor capable of securing cooling characteristics of a hydraulic pressure control valve without incurring complexity in structure and increase in cost.

U.S. Pat. No. 8,157,694 discloses an outboard motor having a power transmission mechanism for transmitting power of an engine to a propeller. The power transmission mechanism has a transmission ratio changing unit having a planetary gear train including a sun gear, planetary gears, and an internal gear. The internal gear is connected to an input side shaft on the engine side. The planetary gears are connected to an output side shaft on the propeller side. The sun gear is connected to a stationary portion via a one-way clutch. The planetary gears and the internal gear and/or the sun gear are connected by an on-off clutch. When the on-off clutch is disengaged, the one-way clutch is engaged and the speed from the input side shaft is outputted from the output side shaft with a reduced speed. When the on-off clutch is engaged, the speed from the input side shaft is outputted from the output side shaft with the same speed.

U.S. Pat. No. 8,277,270 discloses a boat propulsion unit that includes a power source, a propeller, a shift position switching mechanism, a control device, and a retention switch. The propeller is driven by the power source to generate propulsive force. The shift position switching mechanism has an input shaft connected to a side of the power source, an output shaft connected to a side of the propeller, and clutches that change a connection state between the input shaft and the output shaft. A shift position of the shift position switching mechanism is switched among forward, neutral, and reverse by engaging and disengaging the clutches. The control device adjusts an engagement force of the clutches. The retention switch is connected to the control device. When the retention switch is turned on by an operator, the control device controls the engagement force of the clutches to retain a hull in a predefined position. This provides a boat propulsion unit that can accurately retain a boat at a fixed point.

U.S. Pat. No. 8,303,359 discloses an outboard motor that includes a transmission mechanism mounted between an output shaft of an engine and a propeller drive shaft. The transmission mechanism includes a clutch.

U.S. Pat. No. 8,317,556 discloses a boat propulsion system that includes a power source, a propulsion section, a shift position switching mechanism arranged to switch among a first shift position, a second shift position, and a neutral position, a gear ratio switching mechanism, an actuator, and a control section. When switching is to be performed from the neutral position to the first shift position and the high-speed gear ratio, the control section is arranged to cause the actuator to, maintain the low-speed gear ratio, switch to the first shift position, and then establish the high-speed gear ratio when the current gear ratio of the gear ratio switching mechanism is the low-speed gear ratio, and cause the actuator to establish the low-speed gear ratio before switching to the first shift position, switch to the first shift position, and then establish the high-speed gear ratio when the current gear ratio of the gear ratio switching mechanism is the high-speed gear ratio. This arrangement improves the durability of a power source and a power transmission mechanism in a boat propulsion system including an electronically controlled shift mechanism.

U.S. Pat. No. 8,478,464 discloses systems and methods for orienting a marine vessel enhance available thrust in a station keeping mode. A control device having a memory and a programmable circuit is programmed to control operation of a plurality of marine propulsion devices to maintain orientation of a marine vessel in a selected global position. The control device is programmed to calculate a direction of a resultant thrust vector associated with the plurality of marine propulsion devices that is necessary to maintain the vessel in the selected global position. The control device is programmed to control operation of the plurality of marine propulsion devices to change the actual heading of the marine vessel to align the actual heading with the thrust vector.

U.S. Pat. No. 8,924,054 discloses systems and methods are for orienting a marine vessel having a marine propulsion device. A control circuit controls operation of the marine propulsion device. A user input device inputs to the control circuit a user-desired global position and a user-desired heading of the marine vessel. The control circuit calculates a position difference between the user-desired global position and an actual global position of the marine vessel and controls the marine propulsion device to minimize the position difference. The control circuit controls the marine propulsion device to orient an actual heading of the marine vessel towards the user-desired global position when the position difference is greater than a threshold. When the position difference is less than the threshold, the control circuit controls the marine propulsion device to minimize a difference between the actual heading and the user-desired heading while minimizing the position difference.

U.S. Patent Application Publication No. 2014/0045393 discloses an outboard motor that is mounted on a stern of a boat and provided with a transmission and an oil pump. The transmission has a first-speed and second-speed gears, a first-speed gear clutch made of a mechanical dog clutch and a second-speed gear clutch made of a hydraulic clutch each adapted to engage the first and second-speed gears on a power transmission shaft, and a first-speed gear shift actuator adapted to couple the first-speed gear clutch with the first-speed gear. In the transmission, a first speed is established when the first-speed gear is engaged on the power transmission shaft and a second speed is established when the second-speed gear is engaged on the power transmission shaft while the first speed has been established such that power of the engine is transmitted to the propeller through the established speed.

U.S. patent application Ser. No. 14/585,872 discloses a transmission for a marine propulsion device having an internal combustion engine that drives a propulsor for propelling a marine vessel in water. An input shaft is driven into rotation by the engine. An output shaft drives the propulsor into rotation. A forward planetary gearset that connects the input shaft to the output shaft so as to drive the output shaft into forward rotation. A reverse planetary gearset that connects the input shaft to the output shaft so as to drive the output shaft into reverse rotation. A forward brake engages the forward planetary gearset in a forward gear wherein the forward planetary gearset drives the output shaft into the forward rotation. A reverse brake engages the reverse planetary gearset in a reverse gear wherein the reverse planetary gearset drives the output shaft into the reverse rotation.

U.S. patent application Ser. No. 14/258,516 discloses a system that controls the speed of a marine vessel that includes first and second propulsion devices that produce first and second thrusts to propel the marine vessel. A control circuit controls orientation of the first and second propulsion devices about respective steering axes to control directions of the first and second thrusts. A first user input device is moveable between a neutral position and a non-neutral detent position. When a second user input device is actuated while the first user input device is in the detent position, the control circuit does one of the following so as to control the speed of the marine vessel: varies a speed of a first engine of the first propulsion device and a speed of a second engine of the second propulsion device; and varies one or more alternative operating conditions of the first and second propulsion devices.

U.S. patent application Ser. No. 14/574,953 discloses a system for controlling a rotational speed of a marine internal combustion engine having a first operator input device for controlling a speed of the engine in a trolling mode, in which the engine operates at a first operator-selected engine speed so as to propel a marine vessel at a first non-zero speed. A second operator input device controls the engine speed in a non-trolling mode, in which the engine operates at a second operator-selected engine speed so as to propel the marine vessel at a second non-zero speed. A controller is in signal communication with the first operator input device, the second operator input device, and the engine. In response to an operator request to transition from the trolling mode to the non-trolling mode, the controller determines whether to allow the transition based on the second operator-selected engine speed and a current engine speed.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

In certain examples, a method of monitoring and controlling a transmission in a marine propulsion device comprises the steps of receiving a rotational input speed of an input shaft to the transmission, receiving a rotational output speed of an output shaft from the transmission, receiving a shift actuator position value, and receiving an engine torque value. The method further comprises calculating a speed differential based on the input speed and the output speed, and generating a slip profile based on a range of speed differentials, engine torque values, and shift actuator position values.

One embodiment of a system for monitoring and controlling the transmission in a marine propulsion device includes an input speed sensor that senses the rotational input speed of an input shaft to the transmission, an output speed sensor that senses a rotational output speed of an output shaft from the transmission, a shift actuator sensor that senses a shift actuator position value, an engine control module that calculates an engine torque value, and a transmission control module. The transmission control module calculates a speed differential based on the input speed and the output speed and then stores the speed differential with respect to at least one of the engine torque value and the shift actuator position. The transmission control module generates a slip profile of a range of speed differentials, engine torque values, and shift actuator positions.

BRIEF DESCRIPTION OF THE DRAWINGS

The present disclosure is described with reference to the following Figures. The same numbers are used throughout the Figures to reference like features and like components.

DETAILED DESCRIPTION OF THE DRAWINGS

In the present description, certain terms have been used for brevity, clarity, and understanding. No unnecessary limitations are to be inferred therefrom beyond the requirement of the prior art because such terms are used for descriptive purposes only and are intended to be broadly construed. Each of the examples of systems and methods provided in the FIGURES and in the following description can be implemented separately, or in conjunction with one another and/or with other systems and methods.

Figure 1:
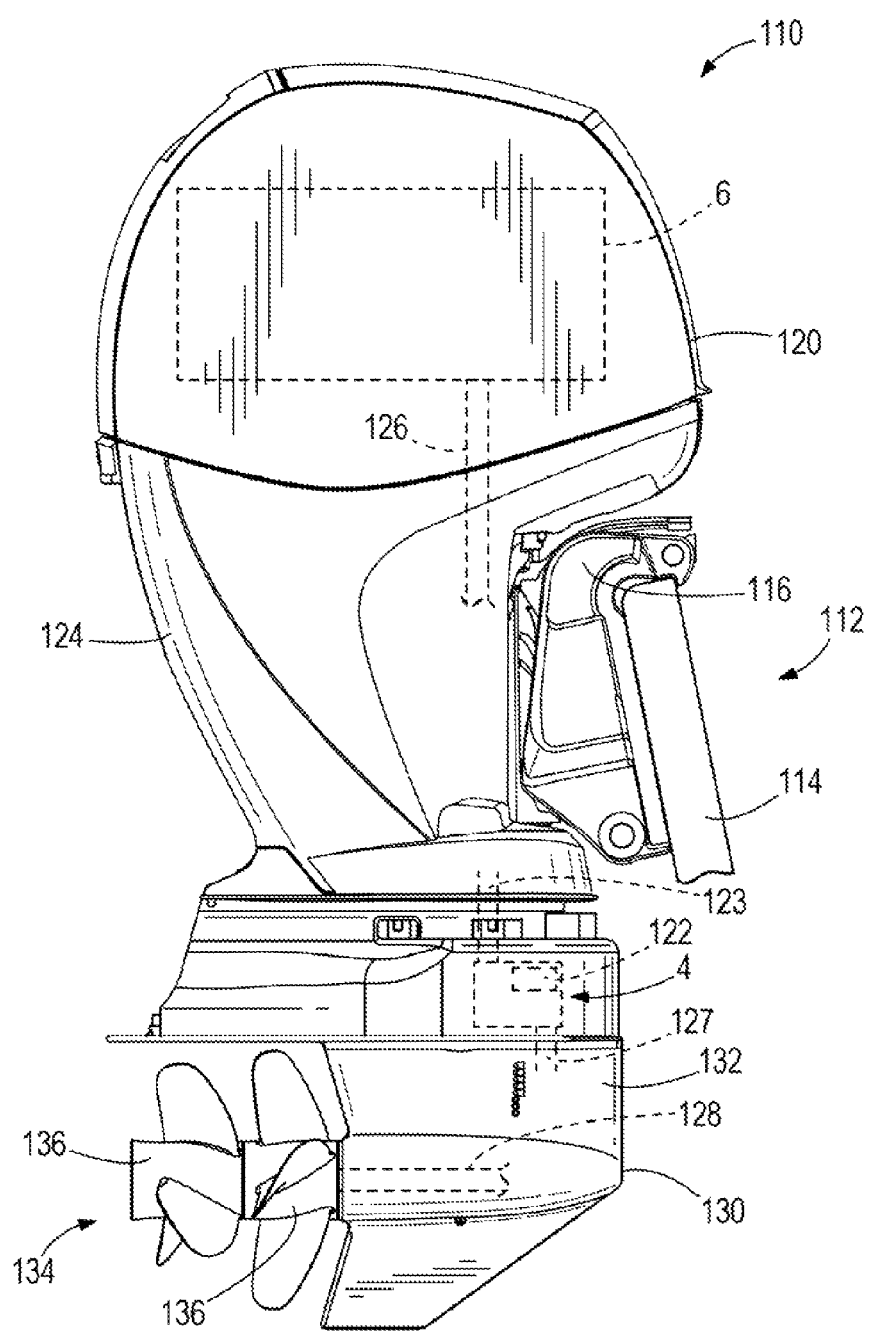
FIG. 1 is a schematic view of a representative marine propulsion device.

FIG. 1 depicts an outboard marine propulsion device 110 for propelling a marine vessel 112 in water. The outboard marine propulsion device 110 is connected to the transom 114 of the marine vessel 112 by a transom bracket 116. As is conventional, the outboard marine propulsion device 110 includes an internal combustion engine 6 located within an upper cowling 120. The engine 6 causes rotation of a drive shaft 126 that extends downwardly from the engine 6 through a drive shaft housing 124. A transmission 4 relays rotational force from the drive shaft 126 to a propulsor shaft 128 located in a propulsor shaft housing 130. The transmission 4 is located in or above a gearcase housing 132, which is disposed beneath the drive shaft housing 124. Rotation of the propulsor shaft 128 causes rotation of a propulsor 134, which in this example includes counter rotating propellers 136. The type of propulsor 134 can vary from that which is shown, and in other examples can include single or multiple propellers or single or multiple impellers, and/or the like.

The transmission 4 includes an input shaft 123 that is driven into rotation by the engine 6. The input shaft 123 can be the drive shaft 126 or an extension of the drive shaft 126 such that rotation of the drive shaft 126 causes concurrent rotation of the input shaft 123. The transmission 4 also includes an output shaft 127 that is connected to the propulsor shaft 128 via, for example, a conventional gearset (not shown) such that rotation of the output shaft 127 causes concurrent rotation of the propulsor shaft 128. In an exemplary embodiment, the input shaft 123 and output shaft 127 are connected together, such as by forward and reverse planetary gearsets, such that the input shaft 123 and output shaft 127 are coaxially aligned.

The transmission 4 engages the input shaft 123 to the output shaft 127 in the forward, neutral, and/or reverse gears. The transmission 4 includes one or more shift actuators 122 adapted to couple the input shaft 123 to the output shaft 127 through forward and/or reverse gearsets. The one or more shift actuator(s) 122 comprise a shift member, such as a clutch or a band, that provides actuation between the input shaft 123 and the output shaft 127. For example, the shift actuator(s) 122 may include any sort of device known in the art for providing actuation between the input shaft 123 and the output shaft 127, including a dog clutch, a cone clutch, a band brake, or any of multiple other types of friction clutches known or available in the art. The shift actuator 122 can also include one or more conventional or electric, mechanical, and/or hydraulic motors. Transmission and shift actuator arrangements are well known in the art and examples are disclosed in U.S. Pat. Nos. 7,458,866, 7,891, 263, 7,942,712, 8,109,800, 8,157,694, 8,277,270, 8,303,359, 8,317,556, 8,478,464, 8,924,054, U.S. Patent Application Publication No. 2014/0045393, and U.S. patent application Ser. Nos. 14/585,872, 14/258,516, and 14/574,953.

Figure 2:
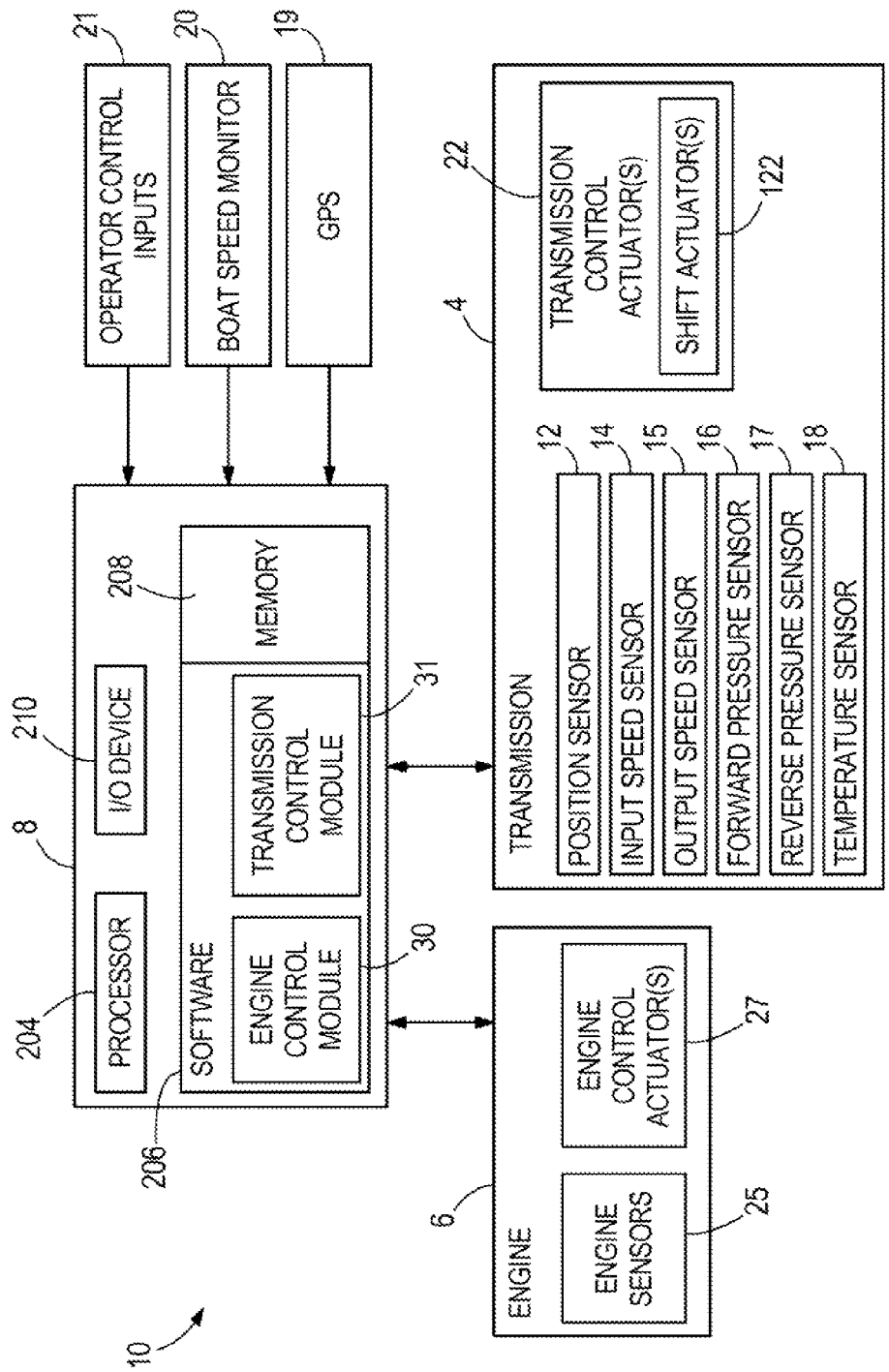
FIG. 2 is a schematic view of a system for monitoring and controlling a transmission.

FIG. 2 depicts one embodiment of a system 10 for monitoring and controlling a transmission in a marine propulsion device 112 described herein above. The embodiment includes an engine 6 having engine sensors 25 and engine control actuators 27, and a transmission 4 having several sensors 12-18 and one or more transmission control actuators 22 associated therewith. The engine 6 and the transmission 4 are in two-way communication with an engine control unit (ECU) 8. ECU 8 comprises a processor 204, an input/output device 210, memory 208, and software 206. The ECU 8 further includes engine control module 30 to control the engine 6 and transmission control module 31 to control transmission 4, each of which may employ processor 204, an input/output device 210, memory 208, and/or software 206. For example, the transmission control module 31 may receive input from various sensors 12-18 associated with the transmission 4 through input/output device 210 and may control the transmission control actuators 22, including the one or more shift actuators 122, according to the structures and methods described herein.

The processor 204 loads and executes the software 206 from the memory 208. Executing the software 206 controls the system 10 to operate as described in further detail herein below. The processor 204 can comprise a microprocessor and/or other circuitry that receives and executes software 206 from memory 208. The ECU 8 can be implemented with a single processing device, or it can be distributed across multiple processing devices and/or subsystems that cooperate in storing and executing program instructions and data. The ECU 8 may include any number of general purpose central processing units, application-specific processors, and logic devices, as well as any other processing devices, combination of processing devices, and/or variations thereof. For example, the engine control module 30 and the transmission module 31 may be executed on the same microprocessor, or on separate microprocessors that are located together or remotely from each other within the system 10. The ECU 8, and/or various parts thereof, can be located anywhere with respect to the marine propulsion device 110 and marine vessel 112 and can communicate with various components of the system 10 via wired or wireless links.

The memory 208 can include any storage media that is readable by the processor 204 and capable of storing the software 206. The memory 208 can include volatile and/or nonvolatile, removable and/or non-removable media implemented in any method or technology for storage of information, such as computer readable instructions, data structures, program modules, or other data. The memory 208 can be implemented as a single storage device but may also be implemented across multiple storage devices or subsystems. The memory 208 can further include additional elements, such as a controller that is capable of communicating with the processor 204. Examples of storage media include random access memory, read only memory, magnetic discs, optical discs, flash memory discs, virtual and/or non-virtual memory, magnetic cassettes, magnetic tape, magnetic disc storage, or other magnetic storage devices, or any other medium which can be used to store the desired information and that may be accessed by an instruction execution system, as well as any combination or variation thereof, or any other type of storage media. In some implementations, the storage media can be a non-transitory storage media.

The input/output devices 210 associated with the ECU 8 can include any one of a variety of conventional computer input/output interfaces for receiving electrical signals for input to the processor and for sending electrical signals from the processor to various components of the system 10. The ECU 8, via the noted computer input/output device 210, communicates with the transmission control actuator(s) 22 and the engine control actuators 27 via one or more communication links, which as mentioned herein above can be wired or wireless links. As explained further herein below, the system 10 is capable of monitoring and controlling operational characteristics of the transmission 4 and/or the engine 6 by sending and/or receiving control signals via one or more of the links represented in FIG. 2. Although the links are each shown as a single link, the term "link" can encompass one or a plurality of links that are each connected to one or more of the components of the system 10.

The system 10 can include one or more operator control input devices 21 for inputting operator commands to the ECU 8. The operator control inputs can include a joystick, throttle/shift lever, and/or a mode selector, which could include one or more push buttons, switches, touch screens, or other devices for inputting an instruction signal to the ECU 8 from the operator of system 10. In certain examples the operator control inputs 21 are operable to instruct the ECU 8 to control the transmission control actuator(s) 22, including the shift actuator 122, for example to enact a gear change amongst forward, neutral and reverse gears, as described herein above. Such operator control inputs 21 for inputting operator commands to a controller are well known in the art and therefore for brevity are not described further herein.

The transmission 4 can include one or more sensors configured to sense "operational characteristics" of the transmission 4 and the engine 6 and convey such information in the form of electrical signals to the ECU 8. The type of operational characteristics can vary and, as explained further herein below, can include a position sensor 12, an input speed sensor 14, an output speed sensor 15, a forward pressure sensor 16, a reverse pressure sensor 17, and a temperature sensor 18. A shift actuator position value is sensed by a shift actuator sensor, which provides an operational characteristic value upon which a position of the shift actuator 122 can be determined. In one embodiment, a position sensor 12 senses a position of the shift actuator 122, or some component or portion thereof, such as a clutch or a forward or reverse band brake. The type of position sensor 12 can vary and can include, for example, a conventional photo eye and/or a conventional pressure transducer. In another embodiment, the position of the shift actuator 122 may be determined via one or more pressure sensors 16, 17 sensing a hydraulic pressure in a hydraulic shift actuator mechanism. Forward pressure sensor 16 and/or reverse pressure sensor 17 may each be pressure sensors sensing hydraulic pressure in a hydraulic motor associated with the shift actuator 122. The pressure sensors 15, 17 are configured to sense the pressure of a hydraulic fluid that operates a hydraulic motor in the shift actuator(s) 122. The type and location of such pressure sensors 16, 17 can vary and in some instances include a conventional pressure transducer. Specifically, the forward pressure sensor 16 may sense hydraulic pressure associated with a forward shift actuator and the reverse pressure sensor 17 may sense hydraulic pressure associated with a reverse shift actuator. In alternative embodiments, the forward and reverse actuation may be carried out by a single actuator having forward actuation and reverse actuation functions.

The input speed sensor 14 senses a rotational speed of the input shaft 123 or the drive shaft 126. Alternatively or additionally, an engine rpm sensor may sense the rotational speed of the drive shaft 126, which may be part of the engine sensors 25. The engine rpm sensor may be used in addition to or in place of the input speed sensor 14. The output speed sensor 15 senses a rotational speed of the output shaft 127 or the propulsor shaft 128. The type and location of the speed sensors 14, 15 can vary and in some examples are Hall Effect or variable reluctance speed sensors located on or in association with input and output shafts 123, 127. These sensors are known in the art and commercially available, for example, from CTS Corporation or Delphi.

One or more temperature sensors 18 may be associated with the shift actuator(s) 122, for example, to sense a temperature on a clutch surface or on the surface of a clutch or a band brake associated with the shift actuator(s) 122. Appropriate temperature sensors are known in the art, and in some examples are the Measurement Specialties Surface Mount Flag Terminal probe, which is an NTC thermistor device that may be affixed to a band brake mount or actuation tab to obtain temperature at the band-drum interface. Other methods may be used, including thermocouple devices embedded into the band itself.

The ECU 8 may receive input from a boat speed monitor 20. The boat speed monitor 20 measures the speed of the marine vessel 112, for example in nautical miles per hour or kilometers per hour.

The boat speed monitor 20 may include any apparatuses known in the art for measuring boat speed, including standard marine speedometers, or pitot tubes that monitor the actual speed of the boat. In alternative embodiments, the boat speed monitor 20 may measure the speed of the boat as land-based speed, such as is provided in U.S. Pat. Nos. 6,485,341 and 7,877,174. The ECU 8 may also receive input from a global positioning system (GPS) 19. The GPS may detect geographical position, movement, propulsion speed, moving distance, moving direction, and so forth of the boat. The boat speed monitor 20 may be provided separately from the GPS 19. Alternatively or additionally, the GPS 19 may serve as a boat speed sensor, such as via a GPS velocity measurement device.

The ECU 8, and specifically the transmission control module 31, is advantageously configured as described herein below to monitor and control the transmission 4. The present invention arises out of the inventors' recognition of need for transmission monitoring and control methods and systems that have the capability of monitoring parts that can wear and providing an operator with a service alert prior to an issue arising. For example, the inventor has recognized a need for systems and methods for monitoring wear on a clutch or a band of a shift actuator in order to give timely service alerts before complete failure of the component. Furthermore, the inventor has also recognized the need for transmission control systems that provide advanced features through controlled slippage.

The present monitoring and control system 10 provides wear detection and features by using a shift actuator position value that reflects a position of the one or more shift actuator(s) 122 in conjunction with an input speed of an input shaft 123 and an output speed of an output shaft 127. Based on the input and output speeds, sensed by sensors 14, 15, the transmission control module 31 can determine a speed differential, which may be any ratio or comparison between the speed of the input shaft 123 and the speed of the output shaft 127. For example, the speed differential may be calculated as a slip percentage, which may be given by the following equation:

$$\text{Slip percent} = (1-(\text{output speed}/\text{input speed})) \times 100$$

The transmission control module 31 continually receives a rotational input speed of the input shaft to the transmission, a rotational output speed of the output shaft of the transmission, a shift actuator position value, and an engine torque value. Based on at least those values, the transmission control module 31 generates a slip profile which describes the transmission behavior over a range of speed differentials, engine torque values, and shift actuator position values. In one embodiment, the slip profile is expressed as the full range of speed differentials, such as slip percentages between 0% slip and 100% slip, with respect to a full range of operating conditions.

Figure 3:
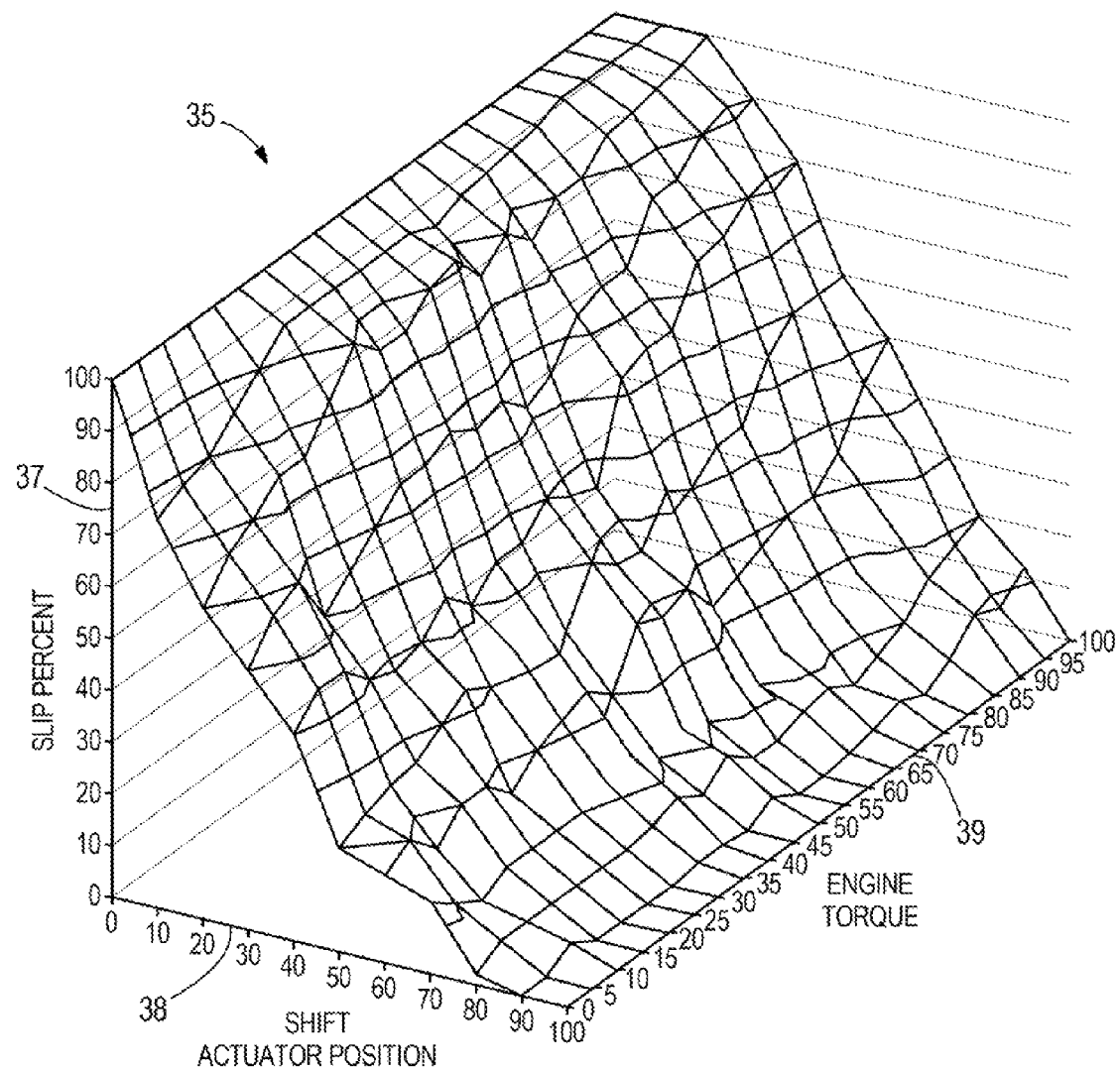
FIG. 3 provides an exemplary 3D map of a slip profile.

The slip profile may be a matrix relating speed differentials, engine torque values, shift actuator position values, and any other of a host of operating condition values. FIG. 3 provides an example of a slip profile expressed as a three-dimensional map 35. The exemplary slip profile map 35 presents slip percent 37 with respect to shift actuator position 38 and engine torque 39. As will be understood by one of skill in the art, slip percent 37 could be replaced by any other speed differential value. In an embodiment like that of FIG. 3, speed differential, such as slip percent, is stored into memory by the transmission control module 31 as a function of engine torque values 39 and shift actuator position values 38. The shift actuator position values 38 may be represented as a position between 0% and 100% of the actuator position range, which may represent the range of position values sensed by position sensor 12 or pressure sensors 16, 17. Alternatively or additionally, the shift actuator position values 38 may be values representing the actual position of the shift actuator measured by a position sensor 12, such as with respect to a fixed point, or may be a pressure value in a hydraulic actuator sensed by pressure sensors 16, 17.

Likewise, the engine torque values may be represented as a percent from 0 to 100 of the range of engine torque values calculated by the engine control module 30. The engine torque value is the amount of torque, or force, applied from the engine 6 to the input shaft 123. The engine torque value may be a measured value, such as by a load sensor, or may be calculated by the engine control module 30 based on input received from engine sensors 25. For example, the engine control module 30 may calculate the engine torque value based on a pressure drop across a throttle, a throttle position, airflow calculations, and/or engine rpm.

In certain embodiments, the transmission control module 31 may further generate the slip profile to include additional values, such as clutch surface temperature, boat speed, time, throttle settings, and/or GPS position. For example, the slip profile may include the speed differential at a range of those aforementioned values. Alternatively, in a basic embodiment, the slip profile may be comprised of a 2D map of shift actuator position values with respect to engine torque values.

The slip profile may be completed once the transmission control module 31 has mapped the engine torque values, shift actuator position values, and/or speed differentials (or any other value tracked in the slip profile) for a full range of operating conditions. The completed slip profile then describes the behavior of the propulsion system for a particular vessel at the time of completion for that range of operating conditions. Thereby, the slip behavior is learned by the ECU 8, providing a customized propulsion profile for each marine vessel 112 that accounts for variation between components and vessels, which may include accounting for such factors as the individual propulsor 134 used, boat weight, gear ratio, and component behavior, or transmission temperature effects. Each such element affects the relationship between engine torque and propeller speed, and/or the relationship between propeller speed and boat speed.

Furthermore, the slip profile can be adjusted over time to account for changes in behavior of the transmission 4, or the components thereof, to track and account for wear. The slip profile can be updated over time to include changes in the speed differential with respect to the range of engine torque values and shift actuator position values. Thereby, the transmission control module 31 maintains an accurate map of the transmission behavior across various input speeds, output speeds, engine torque values, shift actuator positions, etc. The values in the slip profile can be continually assessed to determine whether a wear threshold or a change threshold has been exceeded. For example, changes in the slip profile can be stored and tracked over time to determine whether particular components are wearing at an acceptable or unacceptable rate. For example, the transmission control module 31 may compare a change in the slip profile to one or more change thresholds that describe an expected or acceptable change in transmission behavior due to normal wear. For example, an increase in slip of 5% for a given actuator position over 50 hours of operation may be considered a normal wear rate. If a change in the slip profile exceeds one or more change thresholds, an alert may be generated to notify an operator of a problem or a potential problem. For example, the transmission control module 31 may generate a visual alert at or near the operator control inputs 21 based on the particular change threshold exceeded and/or the amount by which the change threshold is exceeded. Alternatively or additionally, the slip profile may be tracked by comparing it to a wear threshold to identify wear and alert an operator of when components may be nearing the end of their life cycle. For example, the transmission control module 31 may store one or more wear thresholds, such as a wear threshold profile providing maximum values for the speed differentials, engine torque values, and shift actuator positions. For example, a wear threshold profile may be comprised of a maximum speed differential for each value in the range of engine torque values and shift actuator position values. In such an embodiment, the slip profile would be continually compared to the wear profile to determine whether at least a portion of the slip profile has exceeded a wear threshold. If a wear threshold is exceeded, an alert can be generated to notify an operator of the wear condition.

In addition to providing alerts when a change threshold or a wear threshold is exceeded, the transmission control module 31 and the ECU 8 may initiate transmission protection controls to protect the transmission 4 and/or keep the transmission 4 in operation so that the boat can return to port. For example, the transmission control module 31 and/or the ECU 8 may operate to limit the torque through the transmission and prevent unwanted slippage and/or premature failure. In such an embodiment, the transmission control module 31 may instruct the engine control module 30 to operate the engine 6 to limit torque. Alternatively or additionally, the transmission control module 31 may identify particular zones in the slip profile that indicate higher wear values, and the transmission control module 31 may initiate controls that avoid operation in zones of the slip profile that would accelerate wear or create excessive heat buildup.

Once established, the slip profile can also be utilized to control the transmission 4 and or engine 6 to provide a faster and more accurate system for controlling propulsion of the marine vessel. For example, the slip profile values can be used as control targets or initial control values for controlling the transmission control actuator(s) 22, resulting in reduced shift times and achieving a desired slip behavior more quickly and accurately. For example, when ECU 8 determines a desired output speed based on input received from an operator control input 21, the transmission control module 31 may utilize the slip profile to accurately determine a shift actuator position to achieve that desired output speed.

In slip profiles where boat speed is used as a characterization variable, the transmission control module 31 may utilize the slip profile to provide control inertial assisted clutching. A slip profile characterization based on speed may also be useful in embodiments involving a hydraulic shift actuator where the position of the shift actuator is speed dependent. For example, where vessel hydrodynamics could significantly affect slip behavior.

Alternatively or additionally, the slip profile may be utilized to provide drive train protection under certain conditions by allowing the transmission control module 31 to provide controlled slip to reduce the impact of sharp changes in load. For example, the transmission control module 31 may be configured to detect sharp changes in speed or engine torque value parameters, for example caused by a wave jumping event, and to quickly allow a slight slip in the shift actuator 122. This slight slip reduces the peak load increase put on the drive train and mount system. Likewise, the slip profile may be utilized to provide smoother shifting by controlling the shift actuator 122 to provide controlled slip in order to slow down the input shaft 123 to soften the engagement of the gears in the transmission 4.

In still other embodiments, the slip profile may be utilized to determine control instructions when one or more sensors in the transmission 4 or the engine 6 have failed. For example, in the event that failure is detected of an input speed sensor 14, an output speed sensor 15, a position sensor 12, or a pressure sensor 16, 17, the transmission control module 31 may control the shift actuator 122 utilizing the shift actuator position stored in the slip profile in an open-loop control manner in order to continue operation of the transmission 4.

In still other embodiments, the slip profile may be utilized by the transmission control module 31 to apply a controlled slip during a hard deceleration in order to minimize hydrodynamic drag. This could add to boat stability by damping the effect of a rapid deceleration on boat handling and provide a reduced tendency for passengers to be pushed forward during such an event. Such a controlled slip would reduce hydrodynamic drag by allowing the propulsor to rotate freely.

Figure 4:
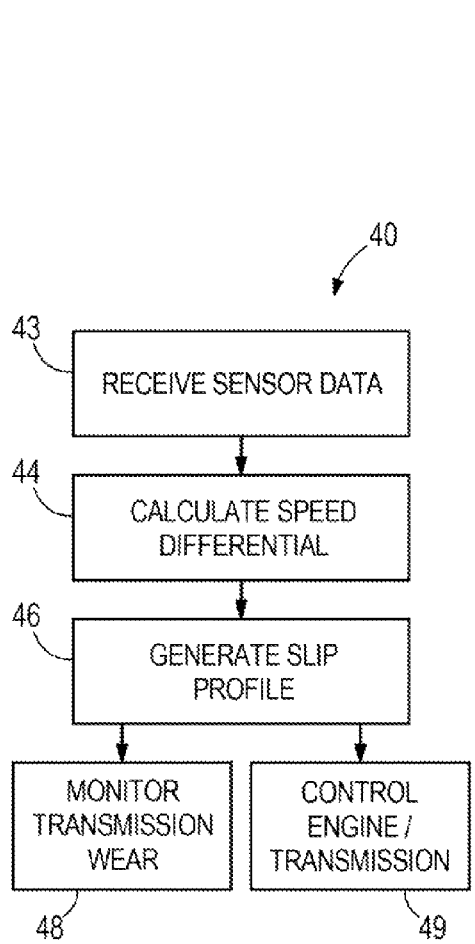
FIG. 4 provides a flow chart depicting one embodiment of a method of monitoring and controlling a transmission.

FIG. 4 depicts one embodiment of a method 40 of monitoring and controlling a transmission. At step 43, sensor data is received, such as from engine sensors 25 or transmission sensors 12-18. At step 44, a speed differential is calculated based on the input speed and the output speed. At step 46, a slip profile is generated based on a range of speed differentials, engine torque values, and shift actuator position values. Based on the slip profile, transmission wear is monitored at step 48 and the engine is controlled based on the slip profile at step 49.

Figure 5:
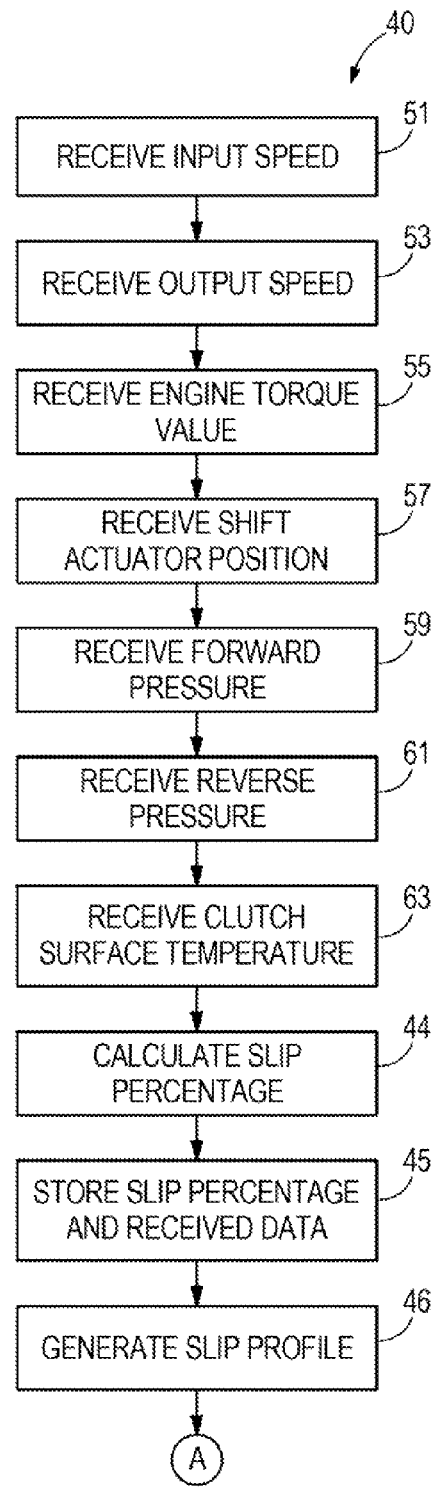
FIG. 5 provides another embodiment of a method of monitoring and controlling a transmission.

FIG. 5 depicts another embodiment of a method 40 of monitoring and controlling a transmission 4. An input speed is received at step 51, an output speed is received at step 53, and an engine torque value is received at step 55. For example, the transmission control module 31 may receive the input and output speeds from speed sensors 14, 15, and may receive the engine torque values from the engine control module 30. A shift actuator position is received at step 57, such as from position sensor 12. Forward pressure is received at step 59 and reverse pressure is received at step 61, for example, by forward and reverse pressure sensors 16, 17. In an alternative embodiment, the transmission control module 31 may receive either the shift actuator position information or the pressure information and may determine the position of the shift actuator based on either the position sensor information or the pressure sensor information. Optionally, a clutch surface temperature may also be received at step 63. The slip percentage is calculated at step 44 based on the input speed and the output speed. Then at step 45 the slip percentage is stored by the transmission control module 31 along with the received speed, engine torque value, shift actuator position, and/or clutch temperature data. A slip profile is then generated at step 46 based on some or all of the data stored at step 45. Once the slip profile is generated, the transmission control module 31 may control the engine 6 and/or transmission 4 based on the slip profile and may utilize the slip profile to monitor wear on the transmission 4.

Figure 6:
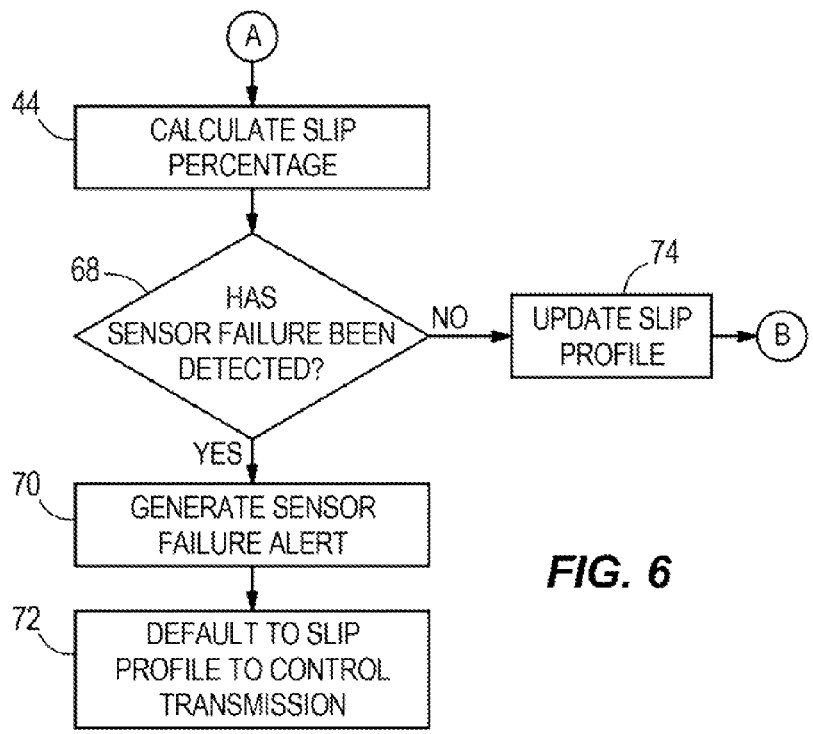
FIG. 6 provides a flow chart depicting another embodiment of a method of monitoring and controlling a transmission.

FIG. 6 depicts one embodiment of a method for monitoring and controlling a transmission involving detecting sensor failure and utilizing the slip profile to provide transmission control values. At step 44, the slip percentage is calculated. In other embodiments, other speed differential values may be calculated and utilized in place of slip percentage. At step 68, the transmission control module 31 determines whether a sensor failure has been detected. For example, the transmission control module 31 may determine whether failure has been detected of the position sensor 12, the input or output speed sensors 14, 15, or the forward or reverse pressure sensors 16, 17. If failure of any of these sensors has been detected, a sensor failure alert may be generated at step 70 and then the transmission control module 31 may utilize the slip profile to provide open-loop control of the transmission 4 at step 72. If sensor failure is not detected at step 58, then the slip profile may be updated at step 74 with the new slip percentage value calculated at step 44. After the slip profile is updated, the transmission control module 31 may execute method steps to assess wear on the transmission 4.

Figure 7:
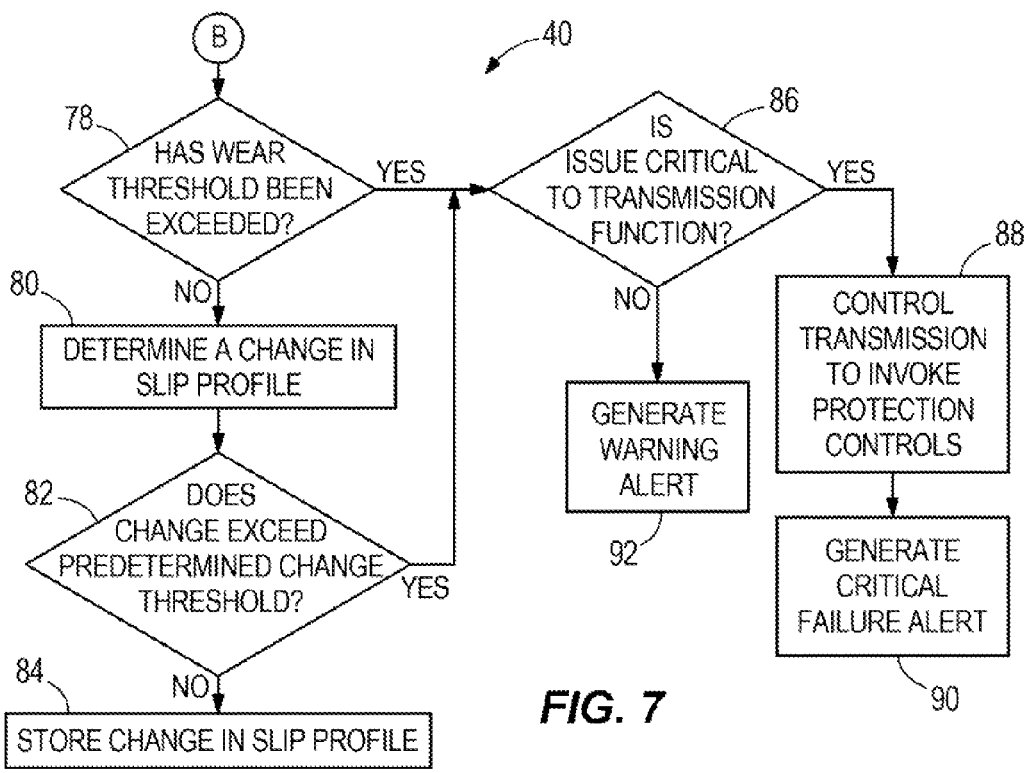
FIG. 7 provides a flow chart depicting another embodiment of a method for monitoring and controlling a transmission.

FIG. 7 depicts one embodiment of a method 40 of monitoring and controlling a transmission including wear monitoring steps. At step 78, the transmission control module 31 determines whether a wear threshold has been exceeded. If the wear threshold has been exceeded, then it may be determined at step 86 whether the issue is critical to the transmission function. For example, a bent linkage actuating a band clutch, or a portion of the clutch lining that has broken away from the band would be cause for prompting the user to return to port for immediate repairs. If the issue is determined to be critical, then the transmission control module 31 may initiate transmission protection controls at step 88 and may generate a critical failure alert at step 90. If the issue is not critical at step 86, then the transmission control module 31 may generate an alert at step 92 warning the operator of the wear issue.

If the wear threshold has not been exceeded at step 78, then the transmission control module may continue to step 80 to determine a change in slip profile. At step 82, the transmission control module 31 assesses whether the change in the slip profile has exceeded a predetermined change threshold. If the change threshold has been exceeded, then the transmission control module may execute steps 86-92 depending on whether the issue is critical to the transmission function. If the change does not exceed the predetermined threshold at step 82, the transmission control module 31 may store the change in the slip profile at step 84 so that the slip behavior of the transmission can be tracked over time.

Figure 8:
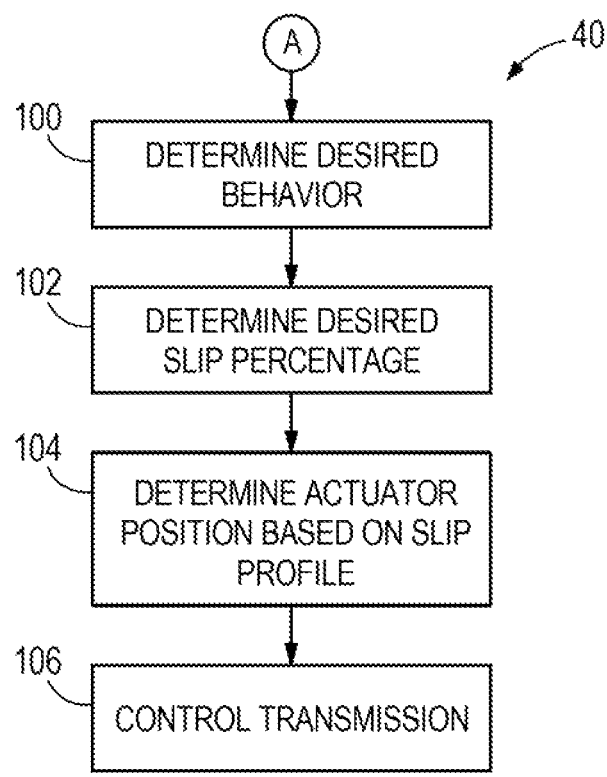
FIG. 8 provides a flow chart depicting another embodiment of a method of monitoring and controlling a transmission.

Alternatively or additionally, method steps may be executed to control the transmission under certain conditions based on the slip profile. FIG. 8 depicts one embodiment of a method 40 of monitoring and controlling a transmission 4, including determining a desired behavior at step 100. For example, the ECU 8 and/or the transmission control module 31 may determine or calculate a desired boat speed and/or a desired speed of the output shaft 127. The transmission control module 31 determines a desired slip percentage at step 102 based on the speed of the input shaft 123 and the desired speed of the output shaft 127. The transmission control module 31 can then utilize the slip profile at step 104 to determine an actuator position that will achieve the desired slip percentage. The shift actuator 122 of the transmission is then controlled at step 106 to achieve the actuator position determined at step 104.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A method of monitoring and controlling a transmission in a marine propulsion device, the method comprising:
   receiving a rotational input speed of an input shaft to the transmission;
   receiving a rotational output speed of an output shaft of the transmission;
   receiving a shift actuator position value of one or more shift actuators;
   receiving an engine torque value;
   calculating a speed differential based on the input speed and the output speed;
   generating a slip profile based on a range of speed differentials at a range of engine torque values and a range of shift actuator position values;
   determining a wear condition based on the slip profile; and
   generating an alert based on the wear condition.

2. The method of claim 1 further comprising storing the speed differential with respect to the engine torque value and the shift actuator position value, and wherein the slip profile includes speed differentials at the range of engine torque values and shift actuator position values.

3. The method of claim 2 wherein the speed differential is a slip percentage value, and the slip profile includes the engine torque values and/or shift actuator position values for slip percentages from 0% slip to 100% slip.

4. The method of claim 2 further including receiving at least one of a clutch surface temperature and a boat speed, and wherein the slip profile further includes the speed differentials at a range of clutch surface temperatures and/or boat speeds.

5. The method of claim 2 further comprising updating the slip profile to include a change in the speed differential with respect to the range of engine torque values and shift actuator position values.

6. The method of claim 5 further comprising determining whether the change exceeds a change threshold, and generating an alert if the change threshold is exceeded.

7. The method of claim 6 further comprising initiating transmission protection controls if the change threshold is exceeded.

8. The method of claim 5 further comprising determining whether at least a portion of the slip profile has exceeded a wear threshold, and generating an alert if the wear threshold is exceeded.

9. The method of claim 8 further comprising initiating transmission protection controls if the wear threshold is exceeded.

10. The method of claim 1 wherein the slip profile includes the range of shift actuator position values with respect to the range of engine torque values.

11. The method of claim 1 wherein the shift actuator position value is one of a position of a shift actuator measured by a position sensor or a hydraulic pressure value in a hydraulic shift actuator measured by a pressure sensor.

12. A system for monitoring and controlling a transmission in a marine propulsion device, the system comprising:
an input speed sensor that senses a rotational input speed of an input shaft to the transmission;
an output speed sensor that senses a rotational output speed of an output shaft from the transmission;
a shift actuator sensor that senses a shift actuator position value;
an engine control unit having a processor;
an engine control module executable on the processor of the engine control unit that calculates an engine torque value;
a transmission control module executable on the processor of the engine control unit that:
calculates a speed differential based on the input speed and the output speed;
stores the speed differential with respect to at least one of the engine torque value and the shift actuator position;
generates a slip profile of a range of speed differentials; at a range of engine torque values and a range of shift actuator positions; and
controlling the transmission based on the slip profile.

13. The system of claim 12 wherein the shift actuator sensor is one of a pressure sensor sensing the shift actuator position value as a hydraulic pressure in a hydraulic shift actuator, or a position sensor sensing the shift actuator position value as a position of a shift actuator component.

14. The system of claim 13 wherein the transmission control module controls the transmission based on the slip profile.

15. The system of claim 14 wherein the transmission is controlled based on the slip profile when failure of the input speed sensor, the output speed sensor, or the position sensor is detected.

16. The system of claim 12 wherein the transmission control module further updates the slip profile over time to include changes in the speed differential with respect to the range of engine torque values and shift actuator positions.

17. The system of claim 16 wherein the transmission control module determines a change in the slip profile, compares the change to a change threshold, and generates an alert if the change threshold is exceeded.

18. The system of claim 17 wherein the transmission control module determines whether at least a portion of the slip profile has exceeded a wear threshold, and generates an alert if the wear threshold is exceeded.

19. The system of claim 18 wherein the transmission control module initiates transmission protection controls if the change threshold or the wear threshold is exceeded.

20. A method of monitoring and controlling a transmission in a marine propulsion device, the method comprising:
receiving a rotational input speed of an input shaft to the transmission;
receiving a rotational output speed of an output shaft of the transmission;
receiving a shift actuator position value of one or more shift actuators;
receiving an engine torque value;
calculating a speed differential based on the input speed and the output speed;
generating a slip profile based on a range of speed differentials at a range of engine torque values and a range of shift actuator position values; and
controlling the transmission based on the slip profile.

* * * * *

UNITED STATES PATENT AND TRADEMARK OFFICE
CERTIFICATE OF CORRECTION

PATENT NO. : 9,441,724 B1
APPLICATION NO. : 14/679164
DATED : September 13, 2016
INVENTOR(S) : Jason F. Pugh It is certified that error appears in the above-identified patent and that said Letters Patent is hereby corrected as shown below:

In the Claims

In claim 12, at column 15, line 37, "differentials;" should instead read --differentials,--.

Signed and Sealed this
Twenty-fifth Day of October, 2016

Michelle K. Lee
*Director of the United States Patent and Trademark Office*